United States Patent
Haeberer et al.

(10) Patent No.: US 6,244,253 B1
(45) Date of Patent: Jun. 12, 2001

(54) PRESSURE CONTROL VALVE

(75) Inventors: Rainer Haeberer, Bretten; Frieder Buerkle, Stuttgart; Helmut Clauss, Achern-Oensbach; Markus Rueckle, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,009

(22) PCT Filed: Jan. 26, 1999

(86) PCT No.: PCT/DE99/00186

§ 371 Date: Apr. 10, 2000

§ 102(e) Date: Apr. 10, 2000

(87) PCT Pub. No.: WO99/60266

PCT Pub. Date: Nov. 25, 1999

(30) Foreign Application Priority Data

May 20, 1998 (DE) .............................. 198 22 671

(51) Int. Cl.⁷ .................................. F02M 37/04
(52) U.S. Cl. ........................ 123/514; 123/198 D
(58) Field of Search .............. 123/514, 198 D, 123/456, 506

(56) References Cited

U.S. PATENT DOCUMENTS

| 4,625,701 | * | 12/1986 | Bartlett et al. | 123/514 |
| 5,232,273 | | 8/1993 | Eckstein et al. | 303/116.4 |
| 5,295,469 | * | 3/1994 | Kariya et al. | 123/456 |
| 5,577,479 | * | 11/1996 | Popp | 123/458 |
| 5,685,278 | * | 11/1997 | Bradford et al. | 123/514 |
| 5,692,476 | * | 12/1997 | Egler et al. | 123/456 |
| 5,778,926 | * | 7/1998 | Tanaka et al. | 137/508 |
| 5,975,061 | * | 11/1999 | Briggs et al. | 123/514 |

FOREIGN PATENT DOCUMENTS

| 41 07 979 A1 | 9/1992 | (DE) . |
| 44 07 978 A1 | 9/1995 | (DE) . |
| 2341087 | * 9/1977 | (FR) . |

* cited by examiner

Primary Examiner—Carl S. Miller
(74) Attorney, Agent, or Firm—Ronald E. Greigg; Edwin E. Greigg

(57) ABSTRACT

A pressure control valve for a fuel injection apparatus for internal combustion engines, including a housing with a high-pressure connection and a return connection and including a cup-shaped piston, which is disposed in a housing bore, can be moved axially between a valve seat oriented toward the high-pressure connection and a stop oriented toward the return connection, counter to the spring force of a spring acting in the direction of the valve seat, and has at least one through opening that connects the inside of the cup-shaped piston to the housing bore, is characterized in that at least one throttle element is disposed upstream and/or downstream of the valve seat in the flow direction of the fuel.

7 Claims, 2 Drawing Sheets

PRESSURE CONTROL VALVE

PRIOR ART

The invention relates to a pressure control valve for a fuel injection apparatus for internal combustion engines, including a housing with a high-pressure connection and a return connection and including a cup-shaped piston. The piston which is disposed in a housing bore and, can be moved axially between a valve seat oriented toward the high-pressure connection and a stop oriented toward the return connection, counter to the spring force of a spring acting in the direction of the valve seat. The piston and has at least one through opening that connects the inside of the cup-shaped piston to the housing bore.

Pressure control valves of this kind have been known for a long time and can be seen, for example, in the German publication "Diesel-Speichereinspritzsystem Common-Rail" [Diesel Common Rail Accumulator Fuel-Injection System] Bosch Technical Instruction No. 1987722054; KH/VDT-0997-DE".

The function of a pressure control valve of this kind essentially corresponds to that of a pressure relief valve. In the event of a failure of the pressure control. The control valve protects the components from bursting as a result of being overloaded. The pressure control valve limits the pressure in the pressure accumulation chamber, the so-called rail, by virtue of the fact that it lifts up from the valve seat in the event of an excessive load and unblocks the through openings. Pressure control valves that are known from the prior art and are described in the above-mentioned publication permit a momentary maximal pressure of 1500 HPa in the pressure accumulation chamber.

This prevents damage to components of the fuel injection system in the event of possible system malfunctions due to an excessive pressure in the fuel injection system. If malfunctions occur which, for example, lead to a continuous full delivery, i.e. at a very high system pressure, which is the case for example in a limp-home program. Then by means of the pressure control valve, through the discharge of a fuel quantity into the tank, a pressure is adjusted in the fuel injection system which on the one hand, prevents damage to any components of the fuel injection system and on the other hand, is at least great enough that an opening of the fuel injection nozzles and consequently a driving operation is possible.

Such a limp-home operation places high demands on the durability of both the spring and the valve in the region of the valve seat. When the pressure control valve is subjected, for example, to a very high pressure that prevails during limp-home operation, a collision of the piston against the valve seat, for example, or a vibration-induced fracture of the spring can occur.

An object of the invention, therefore, is to improve the pressure control valve of this generic type to the extent that on the one hand, in all operating situations, no pulsating pressure is produced in the pressure control valve within predetermined limits and that an impact and/or collision of the piston does not occur either in/against the valve seat or against the stop.

ADVANTAGES OF THE INVENTION

In a pressure control valve of the type described beginning in the, this object is attained according to the invention by virtue of the fact that throttle elements are disposed upstream and/or downstream of the valve seat in the flow direction of the fuel.

The disposition of throttle elements upstream and/or downstream of the valve seat in the flow direction of the fuel has the particularly great advantage that the system pressure is adjusted by means of these throttle elements as a function of the through flow quantity. Furthermore, the throttle elements permit a flow-favorable guidance of the fuel inside the pressure control valve.

A wide variety of embodiments are conceivable with regard to the disposition of the throttle elements. An advantageous embodiment provides that a throttle element is disposed in high-pressure connection. In this instance, the throttle element is disposed upstream of the valve seat and throttles the system pressure prevailing at the valve seat.

Another embodiment provides that a throttle element is disposed in the at least one through opening. This kind of disposition of the throttle elements effectively prevents an impact or collision of the piston against the valve seat.

A particularly advantageous embodiment provides that the cup-shaped piston has an additional piston disposed coaxially in the cup-shaped piston upon which, by means of the spring or by means of an additional spring, a spring force can be exerted in the direction of an additional valve seat embodied on the cup-shaped piston. This additional piston has at least one additional throttle element which can be acted upon by pressurized fuel through the lifting of the additional piston from the additional valve seat. This dual stage pressure control valve has the great advantage that on the one hand, the pressure control valve opens only when a predetermined pressure is exceeded and on the other hand, a "holding pressure" can be set, which can be chosen independently of the opening pressure. The pressure control valve thereby opens only when a high pressure has been exceeded, which is the case, for example, during limp-home operation. The holding pressure, which prevails after the opening of the pressure control valve, prevents the components of the fuel injection apparatus from being continuously loaded with the high opening pressure when the pressure control valve is open. In this connection, the holding pressure can be set to a predetermined value through the selection of the additional throttle elements and the spring force of the spring.

Therefore purely in principle, a wide variety of embodiments are conceivable with regard to the embodiment of the additional throttle elements in the additional piston. One advantageous embodiment provides that the additional throttle elements are through openings in the additional piston. Another advantageous embodiment provides that the additional throttle elements are one or a number of predetermined leaks in the additional valve seat.

The valve seats can be embodied in various ways.

One advantageous embodiment provides that the valve seat is embodied as a conical seat.

Another advantageous embodiment provides that the valve seat is embodied as a spherical seat.

Therefore in the dual stage pressure control valve described above, for example both valve seats can be embodied as conical seats or as spherical seats or can be embodied in alternation as a conical seat and a spherical valve seat.

BRIEF DESCRIPTION OF THE DRAWINGS

Other features and advantages of the invention are the subject of the following description as well as of graphic depictions of several exemplary embodiments.

DESCRIPTION OF THE EXEMPLARY EMBODIMENTS

Figure 1:
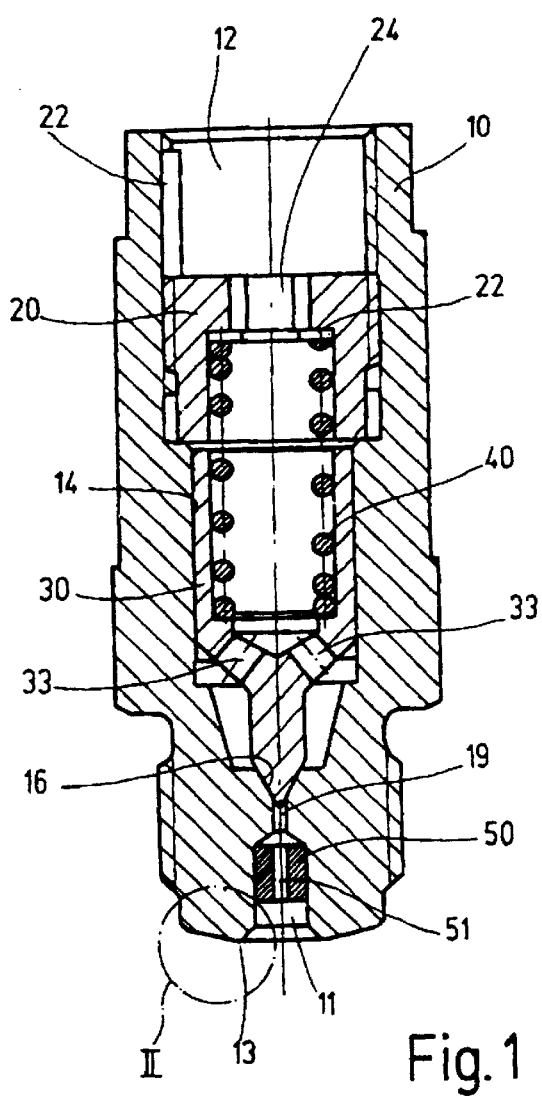
FIG. 1 is a sectional depiction of a pressure control valve according to the invention.

An exemplary embodiment of a pressure control valve shown in FIG. 1 includes a housing 10 with a high-pressure connection 11 and a return connection 12. The housing is provided with a stepped housing bore 14 in the housing, which ends at a valve seat 16 on its end oriented toward the high-pressure connection 11 and in which, on its end oriented toward the return connection 12, a stop 20 is disposed, for example as depicted, by means of being screwed into a thread provided in the housing bore 14. For example, the stop can be secured by means of a Heli-Coil 22, as shown in FIG. 1.

A piston 30 can be moved in the axial direction of the pressure control valve between the stop 14 and the valve seat 16, counter to the spring force of a spring 40. The piston 30 has the shape of a cup-like form, on the interior of which the spring 40 is guided and supported. The stop 20 likewise has the shape of a cup, on the interior of which the spring 40 is guided and supported on its end oriented toward the return connection 12. In order to adjust the initial stress of the spring 40, a disk 22 can be provided in the stop 20, which can be adjusted in the axial direction and locked.

On its end oriented toward the return connection 12, the stop 20 has a through opening 24.

On its end oriented toward the valve seat 16, the piston 30 likewise has through bores 33, which connect the housing bore 14 to the interior of the cup-shaped piston 30.

In the pressure control valve shown in FIG. 1, the valve seat 16 is embodied as a conical seat, wherein on its end oriented toward the valve seat 16, the cup-shaped piston 30 is embodied as conical.

In order to prevent wear and tear due to collision of the cup-shaped piston 30 against the valve seat 16, the provision is made that the sealing point of the valve seat coincides with the effective diameter for the opening of the valve so that a possible collision of the piston 30 against the valve seat 16 does not increase this effective diameter. In this connection, a cone angle difference between the conical end of the piston 30 and the valve seat 16 is advantageously selected to be as small as possible. In a potential collision of the piston 30 against the valve seat 16, this leads to large contact surfaces and consequently to small compressive stresses, which counteract a collision.

A throttle element 50 is provided in the high-pressure connection 11 with a throttle bore 51 that throttles the fuel flowing at high pressure through the high-pressure connection 11. As a result, the diameter of the throttle bore 51 provided in the throttle element 50 can be slightly greater than the inlet bore 19 in the housing 10, as shown in FIG. 1. Naturally, the diameter of the throttle bore 51 can also be equal to or smaller than that of the inlet bore 19. In any event, the throttle element 50 produces a throttling of the pressurized, flowing fuel. The throttle element 50 prevents a pulsating pressure from being produced inside the pressure control valve, which can lead to vibrations and possibly to a vibration-induced fracture of the spring 40. Furthermore, a collision of the piston 30 against the valve seat 16 is prevented.

The throttle element 50, i.e. its length and the diameter of its throttle bore 51, is adjusted so that the piston does not strike against either the stop 20 or the valve seat 16. For example, the throttle element 51 is adjusted so that the piston is held in a "floating position" slightly beneath the stop 20.

Figure 2:
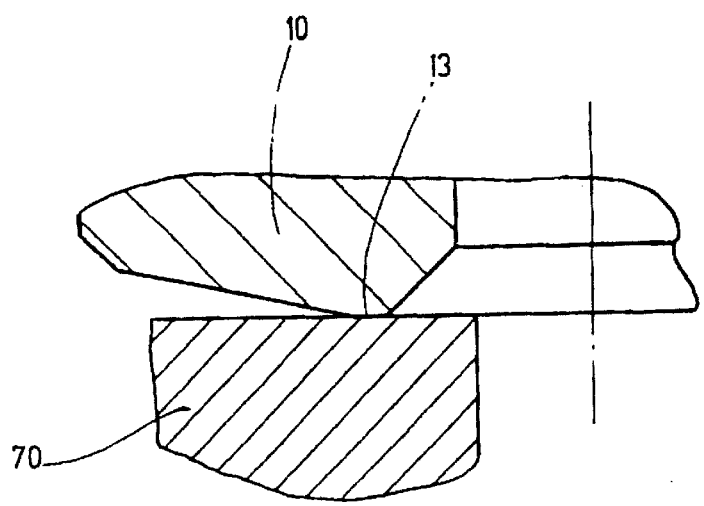
FIG. 2 shows an enlarged detail that is indicated with II in FIG. 1.

As shown in FIG. 1 and particularly in FIG. 2, the sealing of the pressure control valve takes place by means of a so-called "biting edge" 13, whose sealing principle is based either on a plastic deformation of the housing 10 of the pressure control valve or the plastic deformation of a flat surface 70 against which it comes to rest.

Figure 3:
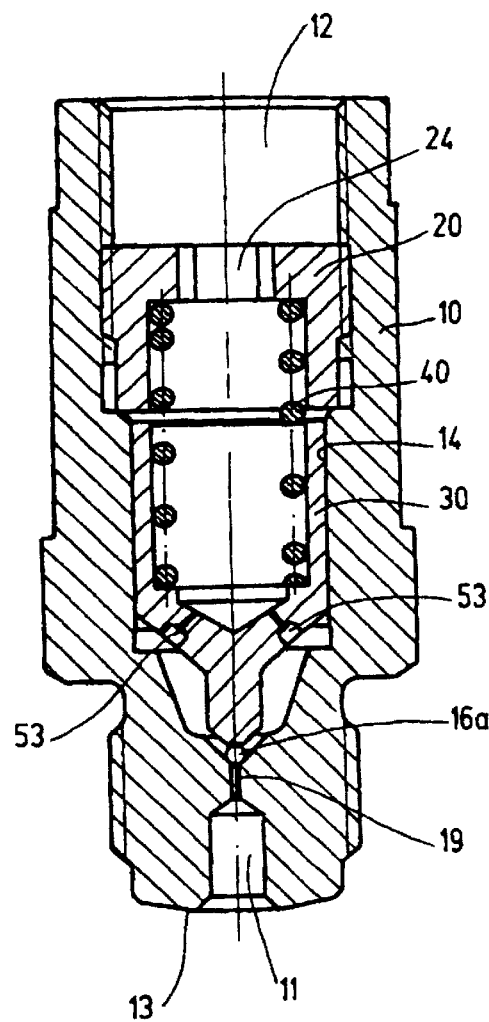
FIG. 3 is a sectional depiction of another exemplary embodiment of a pressure control valve according to the invention.

In a second exemplary embodiment, shown in FIG. 3, the elements which are identical to those of the first exemplary embodiment are provided with the same reference numerals so that with regard to their description, fully inclusive reference is made to the explanations of the first exemplary embodiment.

In contrast to the first exemplary embodiment, the throttle elements are disposed downstream of the valve seat, not upstream of it. As can be seen in FIG. 3, the throttle elements 53 are disposed respectively in the through openings 33. These throttle elements 53 damp the motion of the piston 30 so that it does not strike against either the stop 20 or the valve seat 16.

Furthermore, in the example shown in FIG. 3, the valve seat 16 is not embodied as a conical seat, but as a spherical seat, wherein a sealing sphere 16a is disposed in a conical recess, which closes the inlet bore 19 when the piston 30 strikes against the sealing sphere 16a.

Figure 4:
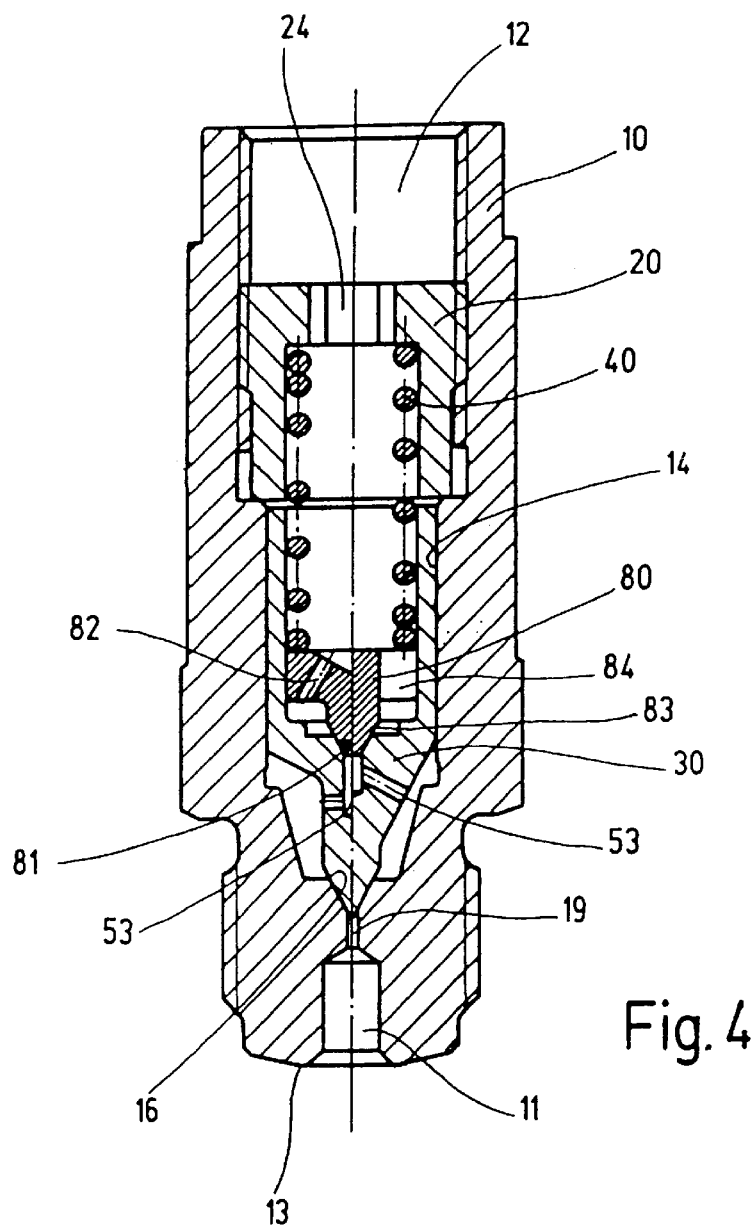
FIG. 4 shows sectional depictions of two other exemplary embodiments of a pressure control valve according to the invention.

In the exemplary embodiments shown in FIG. 4, the elements which are identical to those of the second exemplary embodiment are provided with the same reference numerals so that with regard to their description, fully inclusive reference is made to the explanations of the second exemplary embodiment.

In contrast to the second exemplary embodiment, in the exemplary embodiments shown in FIG. 4, an additional piston 80 is disposed inside the cup-shaped piston 30 and can be moved axially counter to the spring force of the spring 40 which acts in the direction of the valve seat 16. In this additional piston 80, which is disposed coaxial to the cup-shaped piston 30, a throttle element is provided in the form of an opening 81, as shown on the left half of FIG. 4. As shown on the right half of FIG. 4, a throttle element can also be provided in the form of a predetermined leak, which is disposed in the additional valve seat 81 and is connected to an opening 84 in the piston. The throttle elements 53 in the cup-shaped piston 30 can be closed by means of the additional piston 80, which on its end oriented toward the additional valve seat 81 is embodied, for example, as conical, as shown in FIG. 4.

The function of the pressure control valves shown in FIG. 4 will be described below.

If the pressure in high-pressure connection 11 increases beyond a presettable pressure, wherein this presettable pressure can be adjusted by means of the restoring force of the spring 40 and the opening cross section of the inlet bore 19, then the cup-shaped piston 30, which can move in the bore 14, lifts up from the valve seat 16 and thus opens the valve seat 16. The cup-shaped piston 30 is thus moved axially by means of the pressure until it comes into contact with the stop 20.

The highly pressurized fuel flows through the throttle elements 53 to the conical end of the additional piston 80 resting against the additional valve seat 81. The opening pressure of this additional piston 80 is set to a desired pressure, e.g. at a level of 600 HPa, for example during a limp-home program. The adjustment thus occurs by means of the pressure surface upstream of the second piston 80 and the spring tension of the spring 40. After the additional piston 80 has lifted up from the additional valve seat 81, by means of which the throttle elements 53 in the cup-shaped piston 30 are opened, the pressurized fuel, throttled by the throttle elements 82 and 83 disposed in the additional piston 80, flows into the interior of the cup-shaped piston 30 and by way of the opening 24 provided in the stop 20, flows out via the return connection 12, for example into a tank (not shown) of the internal combustion engine. The sizes of the throttle elements 82, 83 are set so that the pressure control valve functions as a regulating valve and maintains a desired pressure, for example at a level of 600 HPa, independently of the through flow quantity in the fuel injection apparatus.

Figure 5:
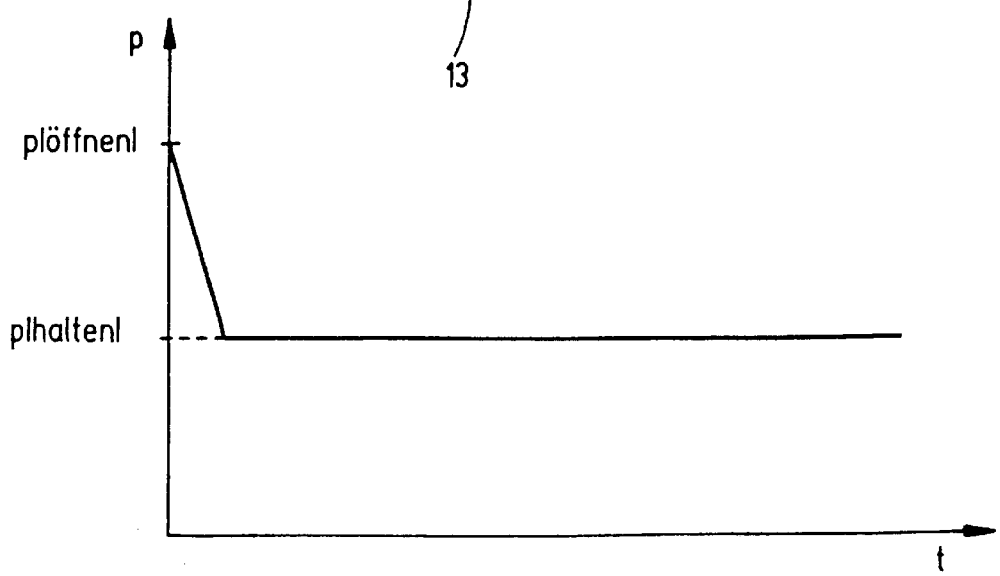
FIG. 5 schematically depicts the chronological march of pressure in the pressure control valves shown in FIG. 4.

The march of pressure over time of the pressure control valves shown in FIG. 4 is schematically depicted in FIG. 5.

Initially, the pressure control valve is opened by means of a high-pressure p (opening), within a short time, the pressure drops to a pressure p (holding) due to the lifting of the additional piston 80 from the additional valve seat 81. By adjusting the throttle elements 82, 83 provided in the additional piston 80, the pressure can then be kept at the predetermined value p (holding).

The exemplary embodiments shown in FIG. 4 of a so-to-speak dual stage pressure control valve of this kind have the great advantage that both the cup-shaped piston 30 and the additional piston 80 are acted on by the spring force of a single spring 40. The low manufacturing costs, small structural space, and simple installation of the pressure control valve are particularly advantageous in this connection.

Naturally, however, instead of only a single spring, two springs can also be provided—namely one spring for the cup-shaped piston 30 and another spring for the additional piston 80. In this instance, the opening pressure of the two valves, which are disposed to an extent coaxially, can be adjusted independently of one another.

The foregoing relates to a preferred exemplary embodiments of the invention, it being understood that other variants and embodiments thereof are possible within the spirit and scope of the invention, the latter being defined by the appended claims.

What is claimed is:

1. A pressure control valve for a fuel injection apparatus for internal combustion engines, including a housing (10) with a high-pressure connection (11) and a return connection (12) and including a cup-shaped piston (30), which is disposed in a housing bore (14) and moved axially between a valve seat (16) oriented toward the high-pressure connection (11) and a stop (20) oriented toward the return connection (12), counter to the spring force of a spring (40) acting in a direction of the valve seat (16), and has at least one through opening (33) that connects the inside of the cup-shaped piston (30) to the housing bore (14), at least one throttle element (50; 53) is disposed upstream and/or downstream of the valve seat (16) in the flow direction of the fuel, the cup-shaped piston (30) having an additional piston (80) disposed coaxially in it, upon which, by means of the spring (40) or by means of an additional spring, a spring force is exerted in a direction of an additional valve seat (81) embodied on the cup-shaped piston (30), and this additional piston (80) has at least one additional throttle element (82; 83) which is acted upon by pressurized fuel through the lifting of the additional piston (80) from the additional valve seat (81).

2. The pressure control valve according to claim 1, in which the at least one throttle element (50, 53) is a throttle element (50) which is disposed in the high-pressure connection.

3. The pressure control valve according to claim 1, in which the at least one throttle element (50, 53) is a throttle element (53) which is disposed in the at least one through opening (33).

4. The pressure control valve according to claim 1, in which the additional throttle elements (82) are through openings in the additional piston (80).

5. The pressure control valve according to claim 1, in which the additional throttle elements (83) are at least one predetermined leak in the additional valve seat.

6. The pressure control valve according to claim 1, in which the valve seat is a conical seat (16).

7. The pressure control valve according to claim 1, in which the valve seat is a spherical seat.

\* \* \* \* \*